United States Patent

Miksic et al.

(10) Patent No.: US 6,800,594 B2
(45) Date of Patent: Oct. 5, 2004

(54) CORROSION INHIBITOR BARRIER FOR FERROUS AND NON-FERROUS METALS

(75) Inventors: Boris A. Miksic, North Oaks, MN (US); Alla Furman, Shoreview, MN (US); Margarita Kharshan, Little Canada, MN (US)

(73) Assignee: Cortec Corporation, St. Paul, MN (US)

(*) Notice: Subject to any disclaimer, the term of this patent is extended or adjusted under 35 U.S.C. 154(b) by 85 days.

(21) Appl. No.: 10/350,845

(22) Filed: Jan. 24, 2003

(65) Prior Publication Data

US 2004/0144957 A1 Jul. 29, 2004

(51) Int. Cl.$^7$ ................................................ C23F 11/10
(52) U.S. Cl. .................. 507/240; 507/243; 507/248; 507/250; 507/259; 507/260; 507/261; 252/391; 252/392; 106/140.24
(58) Field of Search ................................ 507/240, 243, 507/248, 250, 259, 260, 261; 252/391, 392; 106/14.24

(56) References Cited

U.S. PATENT DOCUMENTS

| | | | | |
|---|---|---|---|---|
| 3,629,104 A | * | 12/1971 | Maddox, Jr. ............... | 507/243 |
| 3,779,935 A | * | 12/1973 | McDougall et al. ........ | 510/259 |
| 4,420,414 A | * | 12/1983 | Valone ....................... | 252/392 |
| 5,174,913 A | * | 12/1992 | Alford et al. ............... | 507/240 |
| 5,393,464 A | * | 2/1995 | Martin et al. .......... | 252/389.23 |
| 6,077,460 A | * | 6/2000 | Oppenlander et al. ...... | 252/392 |
| 6,338,819 B1 | * | 1/2002 | Braga et al. .................. | 422/16 |
| 2003/0061968 A1 | * | 4/2003 | Metherly et al. ........ | 106/281.1 |

FOREIGN PATENT DOCUMENTS

| | | | | |
|---|---|---|---|---|
| CA | 997132 A | * | 9/1976 | ........... C07D/49/34 |

* cited by examiner

Primary Examiner—Matthew A. Thexton
(74) Attorney, Agent, or Firm—Haugen Law Firm PLLP

(57) ABSTRACT

An environmentally friendly corrosion inhibiting formulation for the oil-water interface of pipe lines and oil well drilling systems which is prepared pursuant to a process including the steps of reacting an acid selected from the group consisting of a fatty acid anhydride and a 21 carbon dibasic acid with an amine or imidazoline to form a corrosion inhibitor consisting essentially of a fatty acid derivative; dissolving the inhibitor in a fatty acid oil or ester selected from the group consisting of soybean oil or methyl soya ester; adding water dispersing agents consisting of sulfonates and a long chain ethoxylated alcohol; and adjusting the viscosity with an alcohol comprising isopropanol.

3 Claims, No Drawings

CORROSION INHIBITOR BARRIER FOR FERROUS AND NON-FERROUS METALS

BACKGROUND OF THE INVENTION

The present invention relates to an improved corrosion protection system that incorporates selected corrosion inhibitors, blended with water dispersants and dissolved in a biodegradable solvent. Effective for a wide range of refined hydrocarbons, crude and oil/water combinations the system forms an effective corrosion-inhibiting barrier for both ferrous and non-ferrous metals in the presence of water, halogens and corrosive gasses such as dissolved oxygen, sulfur dioxide, carbon dioxide and hydrogen sulfide.

Continuing protection between individual treatment operations is assured due to solubility, dispersibility in crude water mixtures, and the long-term water displacing film formation. The product also provides vapor phase inhibition to protect areas which are inaccessible through direct solution contact. This unique characteristic protects internal parts during low fluid levels and combats atmospheric corrosion in production and storage tanks. Crude oil processing equipment, pipes and pipelines, refinery equipment and systems can be effectively protected against pitting, corrosive gases and water intrusions. Field test applications performed by independent laboratories verify that tests indicate that products pursuant to the invention are highly effective at a concentration level as low as 5–15 ppm. This system will find good acceptance as the use of a biodegradable solvent such as the methyl ester of soya fatty acid provides a much more environmentally friendly system.

A recent article in Materials Performance, a technical journal published by the NACE (National Association of Corrosion Engineering) stated while industry and suppliers had made progress in improving green inhibitors the industry must contend with a number of technical issues related to effectiveness and regulatory issues that vary from region to region.

The development of "green" inhibitors are in direct response to several different standards that have been established in regions of the world and the UK focused on a system callled (OCNS) a notification system. Other countries of the North Sea region have selected a system that also included risk management called CHARM.

As a result of conflicting systems or the lack of one a "green" inhibitor may have different shades of green.

The North Sea group has the best-defined regulations as follows:

ξ Biodegradability: >60% in 28 days
  ξ Marine toxicity: Effective Concentration, 50% (EC50)/Lethal Concentration, 50%(LC50)>10 mg/L to North Sea species
  ξ Bioaccumulation: Log Octanol/Water Partition Coefficient (Pow)<3.

SUMMARY OF THE INVENTION

This new system provides a method and process including addition of a biodegradable corrosion inhibiting system without the extreme care needed in handling conventional mineral oil systems in environmentally protected areas. The criteria that operators must follow in the North Sea (UK, Norway, Denmark, The Netherlands) are very definite and this new inhibitor system dissolved in the methyl ester of soya fatty acid meets all of the specifications. Fatty acid triglycerides such as soy bean oil, canola oil, linseed oil or other glycerides could also be the carrier and need only viscosity or formulation adjustments to provide corrosion inhibitor systems.

EXAMPLE 1

The corrosion inhibitor system used in this new formulation of the invention is specially formulated to be effective in either the oil or the water phase when used in pipeline or drilling applications.

A blend of surfactants, carrier, dispersant and corrosion inhibitor was prepared from the following ingredients:

| Parts by Weight | Component |
| --- | --- |
| 40 parts | methyl soya fatty acid ester |
| 5 parts | ethoxylated alcohol |
| 8 parts | sodium sulfonate |
| 15 parts | Westvaco 1550 diacid |
| 15 parts | Imidazoline |
| 17 parts | Isopropanol. |

The Westvaco acid component, which is a 21 carbon dicarboxylic acid derived from tall oil fatty acid, reacts with imidazoline to form a salt that functions as a corrosion inhibiting barrier giving persistent long-term protection. This material is commercially available.

EXAMPLE 2

A blend of carrier, surfactants, dispersant and corrosion inhibitor was prepared from the following ingredients. Tenax 2010 supplied commercially by Westvaco is a fatty acid anhydride.

| Parts by Weight | Component |
| --- | --- |
| 50 parts | methyl soya fatty acid ester |
| 5 parts | ethoxylated alcohol |
| 10 parts | sodium sulfonate |
| 15 parts | Tenax 2010 reacted with 2-amino 2-methyl propanol |
| 20 parts | Isopropanol. |

The systems are oil soluble due to the fatty acid component of the inhibitor and water brine dispersable due to the ethoxylated sulfonated additions. The Isopropanol is added to reduce the viscosity. In use concentrations of 5–15 ppm are suitable for either pipelines, oil wells or other equipment.

EXAMPLE 3

A water dispersable and oil soluble system can be produced by utilizing the maleic anhydride addition of a fatty acid, which is available commercially from Westvaco as Tenax 2010. This anhydride addition product reacts with amines, alcohols or imidazoline to produce biodegradable inhibitors or can be hydrolyzed with water to provide three carboxyl groups.

| Parts by Weight | Component |
| --- | --- |
| 15 parts | Fatty acid anhydride (Tenax 2010) |
| 15 parts | Imidazoline |
| 40 parts | soy bean oil |

-continued

| Parts by Weight | Component |
| --- | --- |
| 10 parts | Ethoxylated alcohol |
| 5 parts | sodium sulfonate |
| 15 parts | Isopronanol. |

EXAMPLE 4

A blend of carrier, surfactants, dispersants and corrosion inhibitor was prepared with Henkel EMPOL 1008, available commercially, a dimer acid prepared from fatty acids.

| Parts by Weight | Component |
| --- | --- |
| 20 parts | Hekel EMPOL 1008 |
| 20 parts | 2-amino-2-methyl-1-propanol |
| 40 parts | Methyl soya fatty acid ester |
| 8 parts | Sodium sulfonate |
| 12 parts | Isopropanol. |

The fatty acid portion of the inhibitor functions as a corrosion barrier at a pipe surface and the sulfonate and isopropanol assists in dispersing the inhibitor into either the water or oil phase.

Corrosion Testing

All tests were performed on the basis of those components of Example 1 hereinabove.

Wheel Oven Test

The wheel oven test was conducted at 160° F. (71° C.) for 48 hours with the following results:

| Concentration, ppm | Effectiveness, % |
| --- | --- |
| 5 | 92.3 |
| 25 | 95.5 |
| 100 | 98.7 |

Emulsion Tendency

Conditions of the emulsion tendency test were as follows:

Concentration: 100 ppm
Water: Crude Oil=80:20
Temperature: 180° F. (82° C.)

| | % of Emulsion | | |
| --- | --- | --- | --- |
| | 5 min | 15 min | 30 min |
| Example 1 | 8 | 8 | 8 |
| Blank | 6 | 6 | 6 |

Dynamic Circuit Test
Loop Operating Conditions

| | |
| --- | --- |
| Temperature | Ambient |
| Velocity | 6–8 m/min |
| Pressure | 2–3 psi |
| Material | Carbons Steel 1010 |
| Brine | NaCl 5% |
| | $CH_3OOH$ 0.5% |
| | $H_2S$ (saturated) |
| Test Timing | 24 hours |
| Inhibitor Dose | 50 ppm |
| Effectiveness | 78% (polarization resistance technique). |

Prevention of Stress Corrosion Cracking

NACE TM-01-77 Procedure:
Condition of the test:
Concentration of Example 1–200 ppm
Steel—ANSI 1045–1018 annealed
Load—12000 psi (843 $kg.cm^2$)

| Product | Time to Failure, days |
| --- | --- |
| Example 1 | >30 |
| Blank | 8 |

The criteria that has been established for environmentally friendly corrosion inhibitors system for the North Sea (UK, Norway, Denmark and the Netherlands) maybe the most stringent of any global regulations and when the preparation described in Example 1 was evaluated, the results were within these limits.

SAMPLE A

Environmental Testing

Biodegradability, %

| 5 days | 10 days | 25 days |
| --- | --- | --- |
| 39.3% | 52.4% | >60% |

Toxicity 48 hour Static Renewal
Mysidopsis Bahia Definitive Toxicity Test Result (EPA/600/4-90/027F) data

| NOEC*/LOEC**, ppm CTS*** M. bahia | LC50, ppm CTS, M. bahia**** |
| --- | --- |
| 1000 ppm/3000 ppm | 1511.6 |

*The No Observable Effect Concentration is the highest concentration tested that does not significantly reduces survival of the exposed organisms.
**The Lowest Observable Effect Concentration is the lowest concentration tested that does significantly reduce survival of the exposed organisms.
***The Chemically Treated Seawater
****LC 50 - effective concentration to kill 50% of the aquatic organism population (Limits >100 ppm)

The new inhibitor system described in this application easily meet the specification of biodegradability due to the high percentage of a bio-based solvent and an inhibitor that is derived from a fatty acid base that functions as the inhibitor and forms a protective film of absorbed molecules in the pipe that acts as a barrier to corrosive elements.

What is claimed:

1. An environmentally friendly corrosion inhibiting formulation for the oil-water interface of pipe lines and oil well drilling systems which is prepared pursuant to a process including the steps of:

(a) deriving a reactant by reacting a component selected from the group consisting of a fatty acid anhydride and a 21 carbon dibasic acid with an amine or imidazoline to form a corrosion inhibitor consisting essentially of a fatty acid derivative;

(b) dissolving the inhibitor in a fatty acid oil or ester selected from the group consisting of soybean oil or methyl soya ester;

(c) adding water dispersing agents selected from the group consisting of sulfonates and a long chain ethoxylated alcohol; and (d) adjusting the viscosity with an alcohol comprising isopropanol.

2. The environmentally friendly corrosion inhibiting system of claim 1 that will biodegrade at least 60% in about 28 days is oil soluble and water dispersable and is used as follows:

| Type of system to be Protected | Type of Corrosive Medium | Technology of Application | |
|---|---|---|---|
| Pipelines and collection systems for water-encroached crude oil | Separate crude oil/water mixtures with a level of encroachment up to 98%. $CO_2$ - varying concentration $H_2S$ - up to 6,000 ppm | Method of Application Continuous injection of 5–15 ppm | Frequency of Application and Dosage Intermittent treatment: 1,700–3,500 ppm during a 48 hr. period 4 times/year |
| Oil wells and equipment | Crude with a high level of water encroachment and high concentrations of $CO_2$ and $H_2S$. | Injection of the inhibitor into the clearance hole (5–15 ppm) | Periodic injection of 400–1,500 ppm every 2–2½ months. |

3. A corrosion inhibiting formulation prepared from:
(a) a dibasic acid reacted with imidazoline,
(b) methyl ester of soya fatty acid,
(c) water dispersing agents such as sodium sulfonate and ethoxylated alcohol, and
(d) isopropanol.

* * * * *